United States Patent
Helou, Jr. et al.

(10) Patent No.: US 8,152,510 B2
(45) Date of Patent: *Apr. 10, 2012

(54) METHOD FOR USE IN BAKING ARTICLES OF MANUFACTURE AND MOLD FOR USE IN SAID METHOD

(75) Inventors: Elie Helou, Jr., Santa Barbara, CA (US); David A Dellinger, Santa Barbara, CA (US); Ryan M Kane, Ventura, CA (US); Matt A Spradlin, Somis, CA (US)

(73) Assignee: Biosphere Industries, LLC, Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/340,373

(22) Filed: Dec. 19, 2008

(65) Prior Publication Data

US 2009/0238912 A1 Sep. 24, 2009

Related U.S. Application Data

(63) Continuation of application No. 10/608,441, filed on Jun. 27, 2003, now Pat. No. 7,481,645.

(51) Int. Cl.
*A47J 37/06* (2006.01)

(52) U.S. Cl. ........ 425/210; 425/408; 425/420; 425/512; 425/812; 99/373

(58) Field of Classification Search ............. 425/210, 425/350, 348 S, 352–355, 388, 112, 420, 425/408, 812, 512; 426/523, 505; 99/349, 99/353, 373, 439
See application file for complete search history.

(56) References Cited

U.S. PATENT DOCUMENTS

| | | | | |
|---|---|---|---|---|
| 1,875,482 A | | 9/1932 | Nanna | |
| 3,126,582 A | * | 3/1964 | Scott | 425/388 |
| 3,577,593 A | * | 5/1971 | Jackson | 425/388 |
| 3,772,076 A | | 11/1973 | Keim | |
| 4,545,752 A | | 10/1985 | Hanamoto | |
| 4,639,341 A | | 1/1987 | Hanamoto | |
| 4,900,242 A | * | 2/1990 | Maus et al. | 425/149 |
| 5,100,586 A | | 3/1992 | Jennings et al. | |
| 5,169,566 A | | 12/1992 | Stucky et al. | |
| 5,205,863 A | | 4/1993 | Elion | |

(Continued)

FOREIGN PATENT DOCUMENTS

EP 0752209 1/1997

(Continued)

OTHER PUBLICATIONS

Ducey et al, "Alkaline sizing applications surge ahead," Alkaline Paper Advocate, Oct. 1, 1996.

(Continued)

*Primary Examiner* — Richard Crispino
*Assistant Examiner* — Thukhanh Nguyen
(74) *Attorney, Agent, or Firm* — Perkins Coie LLP

(57) ABSTRACT

The present invention relates to a method for producing baked goods and a mold apparatus having a cavity in a desired shape for use in said method, the mold apparatus comprising a gap that allows for venting of vapor produced during heating or baking of a mixture in the mold apparatus but does not allow any significant amount of the mixture to escape from the cavity of the mold apparatus via the gaps.

17 Claims, 15 Drawing Sheets

U.S. PATENT DOCUMENTS

| | | |
|---|---|---|
| 5,209,880 A | 5/1993 | Miwa |
| 5,232,496 A | 8/1993 | Jennings et al. |
| 5,352,111 A | 10/1994 | Selbak |
| 5,354,621 A | 10/1994 | Liebermann |
| 5,356,579 A | 10/1994 | Jennings et al. |
| 5,358,676 A | 10/1994 | Jennings et al. |
| 5,376,320 A | 12/1994 | Tiefenbacher et al. |
| 5,385,764 A | 1/1995 | Andersen et al. |
| 5,412,005 A | 5/1995 | Bastioli |
| 5,453,310 A | 9/1995 | Andersen et al. |
| 5,506,046 A | 4/1996 | Andersen et al. |
| 5,508,072 A | 4/1996 | Andersen et al. |
| 5,514,430 A | 5/1996 | Andersen et al. |
| 5,523,293 A | 6/1996 | Jane |
| 5,527,387 A | 6/1996 | Andersen et al. |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,580,409 A | 12/1996 | Andersen et al. |
| 5,580,624 A | 12/1996 | Andersen et al. |
| 5,582,670 A | 12/1996 | Andersen et al. |
| 5,614,307 A | 3/1997 | Andersen et al. |
| 5,618,341 A | 4/1997 | Andersen et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,635,292 A | 6/1997 | Jennings et al. |
| 5,637,412 A | 6/1997 | Jennings et al. |
| 5,641,584 A | 6/1997 | Andersen et al. |
| 5,654,048 A | 8/1997 | Andersen et al. |
| 5,658,603 A | 8/1997 | Andersen et al. |
| 5,658,624 A | 8/1997 | Anderson et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,665,152 A | 9/1997 | Bassi et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,693,355 A | 12/1997 | Haas |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Tiefenbacher et al. |
| 5,714,217 A | 2/1998 | Andersen et al. |
| 5,716,675 A | 2/1998 | Andersen et al. |
| 5,720,913 A | 2/1998 | Andersen et al. |
| 5,736,209 A | 4/1998 | Andersen et al. |
| 5,738,921 A | 4/1998 | Andersen et al. |
| 5,753,308 A | 5/1998 | Andersen et al. |
| 5,766,525 A | 6/1998 | Andersen et al. |
| 5,776,388 A | 7/1998 | Andersen et al. |
| 5,783,126 A | 7/1998 | Andersen et al. |
| 5,783,240 A | 7/1998 | Wenger et al. |
| 5,786,080 A | 7/1998 | Andersen et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,851,634 A | 12/1998 | Andersen et al. |
| 5,868,824 A | 2/1999 | Andersen et al. |
| 5,928,741 A | 7/1999 | Andersen et al. |
| 5,973,082 A | 10/1999 | Elmore |
| 5,976,235 A | 11/1999 | Andersen et al. |
| 6,030,673 A | 2/2000 | Andersen et al. |
| 6,083,586 A | 7/2000 | Andersen et al. |
| 6,090,195 A | 7/2000 | Andersen et al. |
| 6,146,573 A | 11/2000 | Shogren et al. |
| 6,168,857 B1 | 1/2001 | Andersen et al. |
| 6,180,037 B1 | 1/2001 | Andersen et al. |
| 6,200,404 B1 | 3/2001 | Andersen et al. |
| 6,214,399 B1 | 4/2001 | Garbo |
| 6,220,849 B1 | 4/2001 | Atake |
| 6,228,898 B1 | 5/2001 | Nakanishi |
| 6,231,970 B1 | 5/2001 | Andersen et al. |
| 6,240,836 B1 | 6/2001 | Barbo |
| 6,277,899 B1 | 8/2001 | Bastioli |
| 6,347,934 B1 | 2/2002 | Andersen et al. |
| 6,379,446 B1 | 4/2002 | Andersen et al. |
| 6,413,069 B2 | 7/2002 | Oono |
| 6,494,704 B1 | 12/2002 | Andersen et al. |
| 6,524,519 B1 * | 2/2003 | Ohba et al. ............ 425/812 |
| 6,585,859 B1 | 7/2003 | Hakansson |
| 6,589,327 B1 | 7/2003 | Snidow |
| 6,846,573 B2 | 1/2005 | Seydel |
| 6,878,199 B2 | 4/2005 | Bowden et al. |
| 7,083,673 B2 | 8/2006 | Bowden et al. |
| 7,196,124 B2 | 3/2007 | Parker et al. |
| 2003/0047110 A1 | 3/2003 | Poovarodom et al. |
| 2003/0143417 A1 | 7/2003 | Kesselring et al. |
| 2003/0216492 A1 | 11/2003 | Bowden et al. |
| 2004/0265453 A1 | 12/2004 | Helou et al. |
| 2005/0089606 A1 | 4/2005 | Dellinger |
| 2006/0057319 A1 | 3/2006 | Gleich et al. |
| 2006/0075544 A1 | 4/2006 | Kriesel et al. |
| 2006/0110498 A1 | 5/2006 | Dellinger |
| 2006/0255507 A1 | 11/2006 | Bowden et al. |
| 2007/0021534 A1 | 1/2007 | Glenn et al. |

FOREIGN PATENT DOCUMENTS

| | | |
|---|---|---|
| EP | 0880896 | 12/1998 |
| JP | 36-000339 | 1/1924 |
| JP | 25-009387 | 11/1925 |
| JP | 49-083397 | 11/1947 |
| JP | 45-016708 | 7/1970 |
| JP | 57-110150 | 7/1982 |
| JP | 58-009644 | 1/1983 |
| JP | 09-028274 | 4/1997 |
| WO | WO92/10938 | 7/1992 |
| WO | WO99/45073 | 9/1999 |
| WO | WO00/39215 | 7/2000 |
| WO | WO2005/021633 | 10/2005 |

OTHER PUBLICATIONS

European Patent Office, Supplemental Search Report for EP 04755659.2 dated Jul. 28, 2008.

European Patent Office, Examiner's Report for EP04755659.2 dated Jun. 17, 2009.

European Patent Office, Supplemental Search Report for EP04782322 dated Jun. 10, 2009.

Hagenmaier et al., Wax microemulsions . . . , J. Agri Food Chem, 42, 899-902.

Japanese Patent Office, Translation of the Office Action issued for Application No. 2003-517440, dated Dec. 2, 2008.

United States Patent and Trademark Office, International Search Report and Written Opinion for PCT/US04/19619 dated Nov. 27, 2006.

United States Patent and Trademark Office, International Search Report and Written Opinion for PCT/US04/27824 dated Aug. 29, 2008.

United States Patent and Trademark Office, International Search Report and Written Opinion for PCT/US06/42800 dated May 2, 2007.

United States Patent and Trademark Office, International Search Report and Written Opinion for PCT/US07/88989 dated Apr. 18, 2008.

United States Patent and Trademark Office, International Search Report and Written Opinion for PCT/US08/69266 dated Oct. 2, 2008.

United States Patent and Trademark Office, International Search Report and Written Opinion for PCT/US08/80979 dated Dec. 24, 2008.

European Patent Office, Supplemental Search Report and Search Opinion for EP06827369.7, dated Oct. 7, 2009.

European Patent Office, Examination Report for EP0478322.4, dated Sep. 23, 2009.

* cited by examiner

METHOD FOR USE IN BAKING ARTICLES OF MANUFACTURE AND MOLD FOR USE IN SAID METHOD

CROSS-REFERENCE TO RELATED APPLICATIONS

This application is a continuation application of U.S. patent application Ser. No. 10/608,441, filed Jun. 27, 2003 now U.S. Pat. No. 7,481,645, which is incorporated herein by reference.

BACKGROUND OF THE INVENTION

1. Field of the Invention

The invention generally relates to methods for the production of baked goods and articles of manufacture and molds for use in said methods.

2. Background

The majority of the molding systems producing baked goods today comprise a two piece mold with a female lower half and a male upper half. In some cases, the female lower half is made up of two halves—for example, a female ice cream cone mold is usually made up of two halves as can be seen U.S. Pat. No. 5,693,355 to Haas. Typically, the molds are heated and remain heated to a temperature that is sufficient to bake the material deposited in the molds within a certain time period without burning the material.

As the product is baked, water or other liquid in the mixture is turned into steam or other vapor that must be discharged from the mold to allow for proper formation of the final product. This is typically accomplished through vents in the mold apparatus. As an unintended result of having vents for vapor or steam to escape, excess material is also typically ejected from the cavity of the mold via the vent. The venting of excess material causes significant waste of both raw materials and energy. Loss of raw materials, a significant cost in the manufacturing process, can be in excess of 20% to 30%. Similarly, to compensate for the loss of material, additional material must be added to the mold which requires additional energy for baking, also a significant expense in most processes.

Further, additional steps must also be added to the manufacturing process for removal of the excess material from the baked product to produce the final product. The vents are usually trimmed and/or sanded and then disposed of along with the excess material. Moreover, the trimming process itself can cause defects and thus increase the probability of rejection of the final product. Finally, if vent wear occurs, the entire mold may have to be replaced or additional material added to the mold because vent cross-section is an important component in controlling how much material is vented out of the mold apparatus.

Accordingly, there is a need in the art for improved molds and methods for use of said molds for the manufacture of baked goods that allow for venting of vapor produced during heating or baking without substantial loss of material.

SUMMARY OF THE INVENTION

It is an object of the present invention to provide a method for manufacturing articles or baked goods that allows for venting of vapor produced during heating or baking without substantial loss of material.

It is another object of the present invention to provide a mold having a gap or gaps for venting vapor produced during heating or baking without substantial loss of material.

These and other aspects of the present invention which may become obvious to those skilled in the art through the following description of the invention are achieved by a method for baking articles of manufacture and a mold for use in said method.

One embodiment of the present invention is a method comprising the steps of adding a mixture to a mold apparatus having a cavity and baking the mixture in the mold apparatus until the mixture is form stable, wherein upon contact of the mixture with the surface of the cavity, a skin is formed on the exterior of the mixture, and wherein the mold apparatus comprises a gap such that vapor can exit the cavity of the mold apparatus through the gap without substantial loss of the mixture through the gap.

Another embodiment of the present invention is a mold apparatus comprising a cavity, a gap in communication with the cavity and the exterior of the mold apparatus for venting vapor wherein the gap is configured such that it allows escape of vapor from the cavity while at the same time does not allow escape of a mixture from the cavity.

A third embodiment of the present invention is a mold apparatus comprising a male mold half, a female mold half wherein contact of the male mold half and the female mold half forms a cavity in a desired shape, and a gap in communication with the cavity and the exterior of the mold apparatus for venting vapor wherein the gap is configured such that it allows escape of vapor from the cavity while at the same time does not allow escape of a mixture from the cavity.

DETAILED DESCRIPTION OF THE INVENTION

Figure 1:
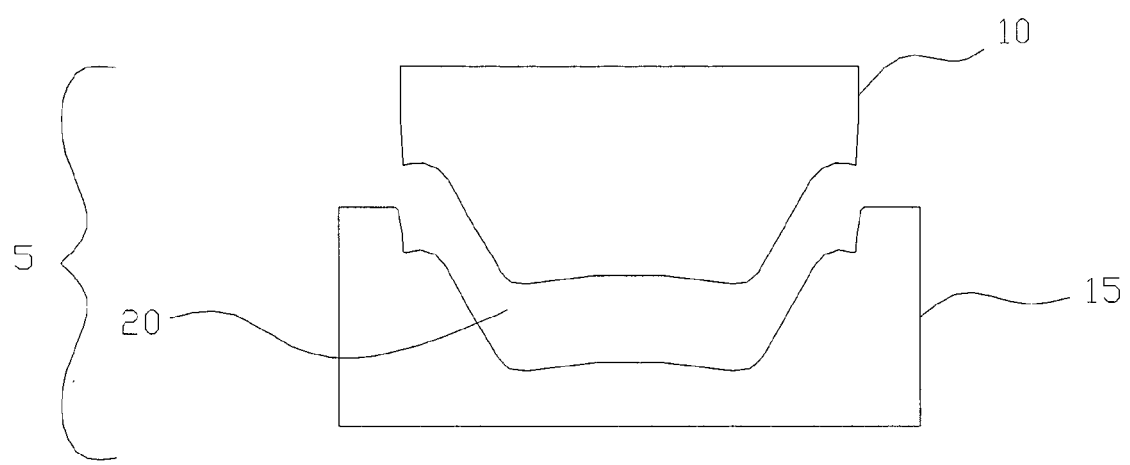
FIG. 1 is cross-sectional of an open two-piece mold.

In order to fully understand the manner in which the above-recited details and other advantages and objects according to the invention are obtained, a more detailed description of the invention will be rendered by reference to specific embodiments thereof.

1. Molding Method

A method according to the present invention comprises the steps of providing a mold apparatus having a cavity in the shape of a desired final product and a gap or gaps for venting vapor from the mold apparatus produced during heating or baking, heating or baking the mold apparatus, adding a mixture that is liquid or semi-liquid to the cavity of the mold apparatus prior to closing the mold apparatus and closing the mold apparatus, wherein as vapor or steam is produced in the cavity during heating or baking, the mixture is pushed by vapor or steam pressure to completely fill the cavity, and upon sufficient contact of the mixture to the heated mold apparatus a skin forms on the outer surface of the mixture, the skin being permeable or semi-permeable to the vapor or steam and the skin and gap being such that, in combination, they allow escape of steam or vapor from the cavity to the exterior of the mold apparatus but do not allow any significant amount of the mixture to escape. Any significant amount of mixture as referred to herein is any amount the loss of which would cause any one of the aforementioned drawbacks found in the prior art in a meaningful amount, such as waste of raw materials, waste of energy needed to heat additional mixture, additional processes to remove excess material to form the final product and clogging of the gap or gaps The vapor escapes while the mixture is retained in the cavity because the gap is of sufficient size—i.e., small enough—that the skin formed on the surface of the mixture from contact of the mixture with the heated mold surface, when under sufficient pressure from the steam or vapor produced during heating or baking of the mixture, allows the steam or vapor to escape through the skin and then through the gap to the exterior of the mold apparatus without rupture of the skin. Because the skin is not permeable to the mixture, which may still be liquid or semi-liquid prior to the completion of heating or baking, the mixture cannot escape from the cavity of the mold apparatus.

The aforementioned method according to the present invention allows for venting of the vapors produced during baking without significant loss of mixture and the associated drawbacks of said loss outlined above such as waste of raw materials, waste of energy needed to heat additional mixture, additional processes to remove excess material to form the final product and clogging of the gap or gaps.

The aforementioned method according to the present invention may be used to manufacture both edible baked goods and other baked products such as starch-based materials for use as food containers and the like. Mixtures for use in said method are typically water-based. One skilled in the art, however, will recognize that the mixtures need not be water-based, such as alcohol-based mixtures or other non-water-based mixtures. Specific examples of mixtures that may be used said method should be readily apparent to one skilled in the art and include, but are not limited to, common baking mixtures such as waffle, cookie dough, or ice cream cone batter, starch-based mixtures comprised of starch and water and mixtures comprising composite materials mixed with resins that form skins which are still permeable to the gases produced during heating or baking. Further, specific baking procedures such as heating temperature and time will vary depending upon the specific mixture to be heated or baked and should be apparent to one skilled in the art.

2. Mold Apparatus

Figure 2:
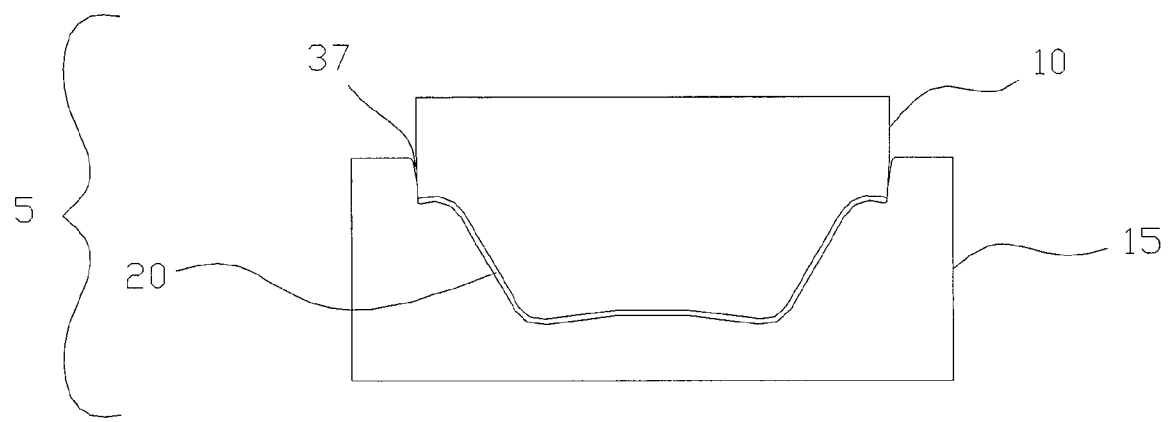
FIG. 2 is cross-sectional of a closed two-piece mold.

Referring to FIGS. 1 and 2, a mold 5 according to the present invention is shown having a male mold half 10 and a female mold half 15 to form a cavity 20. The mold 5 can have a variety of shapes depending upon the desired shape of the final product to be baked. The mold 5 that is shown is configured such that the cavity 20 is in the shape of a bowl.

The male mold half 10 and the female mold half 15 may be held together by means commonly known in the art such as a hydraulic press, mechanical locking mechanism or clamping mechanism, not shown. As described above, the complete filling of the cavity 20 with a mixture that is initially liquid or semi-liquid is caused by the force created during heating or baking by the formation of vapor in the cavity 20. The vapor pressure then pushes the mixture to substantially fill the cavity 20. Accordingly, it is not necessary to press the male and female mold halves 10 and 15 together to push the material to fill the cavity 20 so long as the male and female mold halves 10 and 15 are held in position during heating or baking. Both mechanical pressing and vapor pressure, however, could be used in combination to fill the cavity 20 if so desired.

Figure 3:
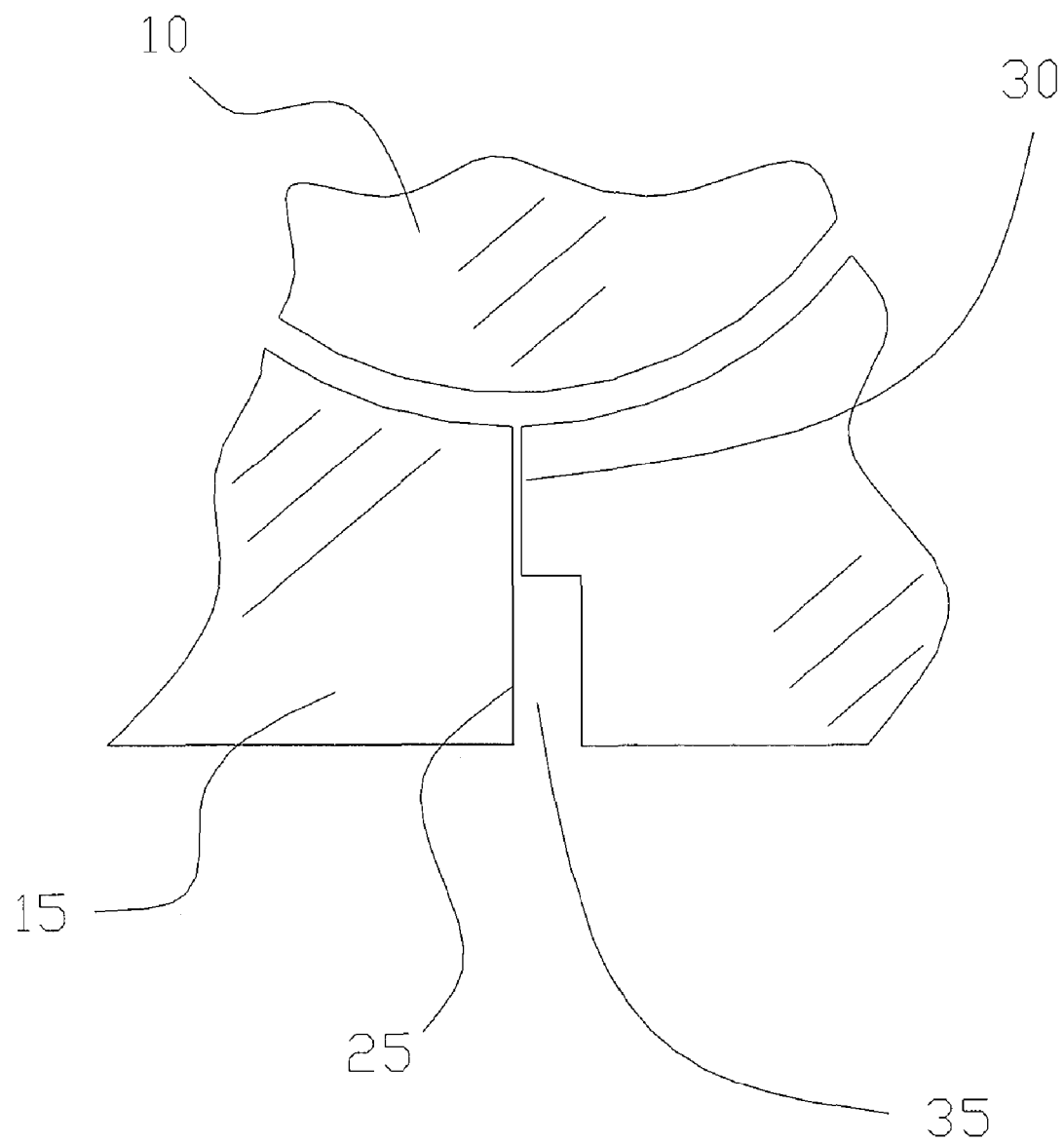
FIG. 3 shows a vent in a mold.

Referring to FIG. 3, a section of the mold 5 is shown having a gap 25 for venting steam or other vapor formed during heating or baking from the cavity 20 to the exterior of the mold 5. The gap 25 having a first portion 30 in communication with the cavity 20 and a second portion 35 in communication with the first portion 30 and the exterior of the mold 5 wherein the second portion 35 is wider than the first portion 30. The gap 25 is configured such that, in combination with the skin formed during heating or baking as described above, the gap 25 allows for venting steam or other vapor formed during heating or baking without allowing the escape of the mixture. The dimensions of the gap 25 will vary depending on the particular mixture used. Generally, it has been found that the first portion 30 of the gap 25 has width preferably of about 0.001 inches to about 0.030 inches, and more preferably about 0.001 inches to about 0.015, and most preferably about 0.001 inches to about 0.006 inches, and has a length preferably of about 0.001 inches to about 2 inches, and more preferably about 0.001 to about 0.5 inches, and most preferably about 0.001 to about 0.1 inches. Further, the first portion 30 or the second portion 35 of the gap 25 may vary or be constant along its respective length.

Material used to form the mold 5 can be selected from common materials known in the art including, but not limited to, metals such as cast iron and aluminum or other suitable materials. Further, depending on the specific material to be selected and the specific mixture to be formed by the aforementioned method, the surfaces of the cavity 20 of the mold 5 may be treated with methods such as sand blasting, plating with metals such as nickel plating or other treatment methods commonly known in the art where said surface treatment may aide in the formation of desired characteristics in the surface of the final product or improve the production process such as facilitating the removal of the product from the cavity 20 of the mold 5 after formation. Further, a heating mechanism may be incorporated into the mold 5.

In addition, referring to FIG. 2, during molding the mold 5 may be held slightly open leaving a space at 37 at the outermost interface between the male mold half 10 and the female mold half 15 that extends around the circumference of the outermost interface such that vapor may initially escape through said space at 37. As the heating or baking process proceeds, the mold 40 is substantially closed sealing the space at 37. This substantial closing of the mold 40 will insure that the male mold half 10 and the female mold half 15 are substantially aligned prior to the product becoming form stable and will also allow for some heat transfer between the male mold half 10 and the female mold half 15 to reduce temperature differentials between the male mold half 10 and the female mold half 15.

a. Venting Configurations

Figure 4:
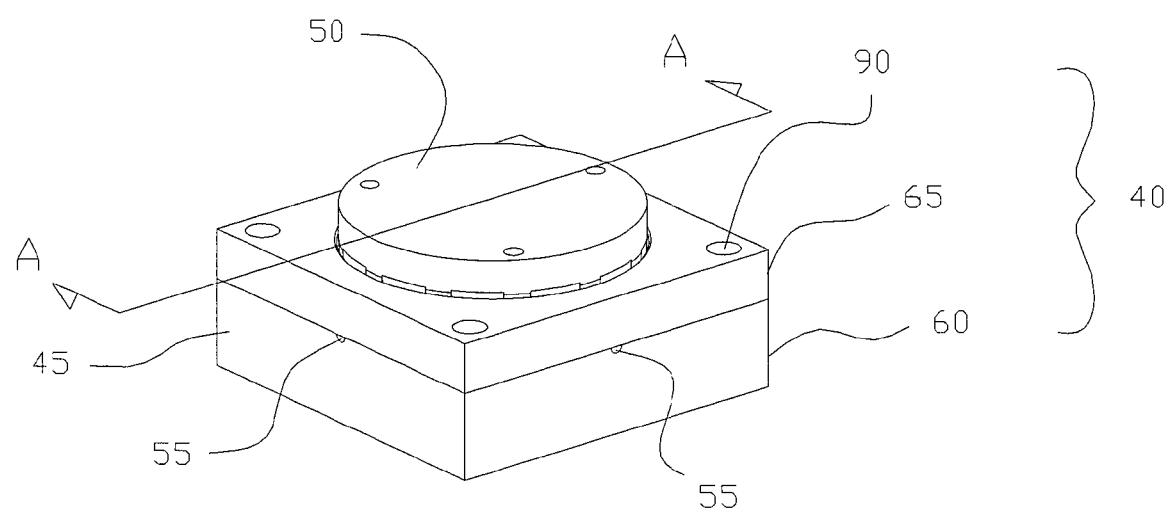
FIG. 4 is a perspective view of a venting feature applied in a horizontal fashion to a female mold.
Figure 5:
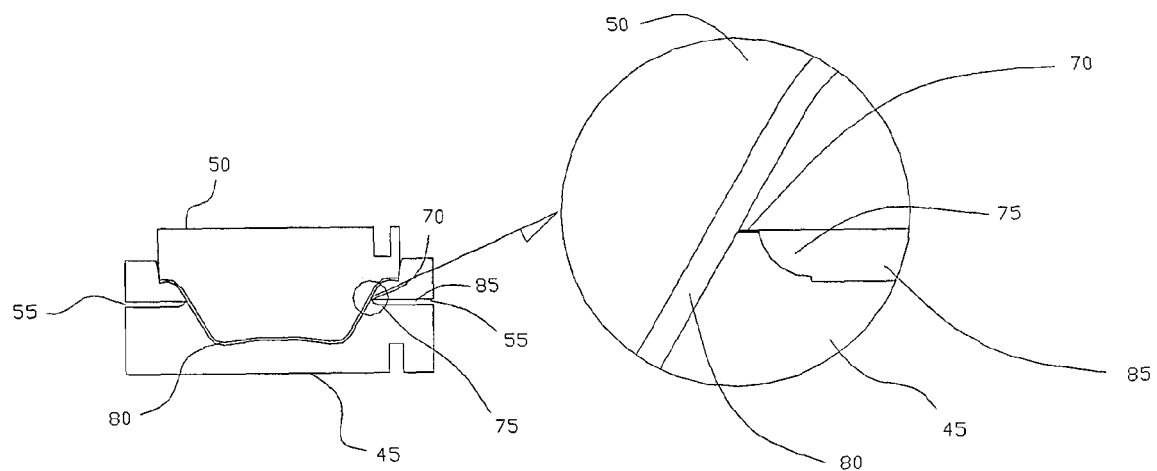
FIG. 5 is a cross-section view of a venting feature applied in a horizontal fashion to a female mold.
Figure 6:
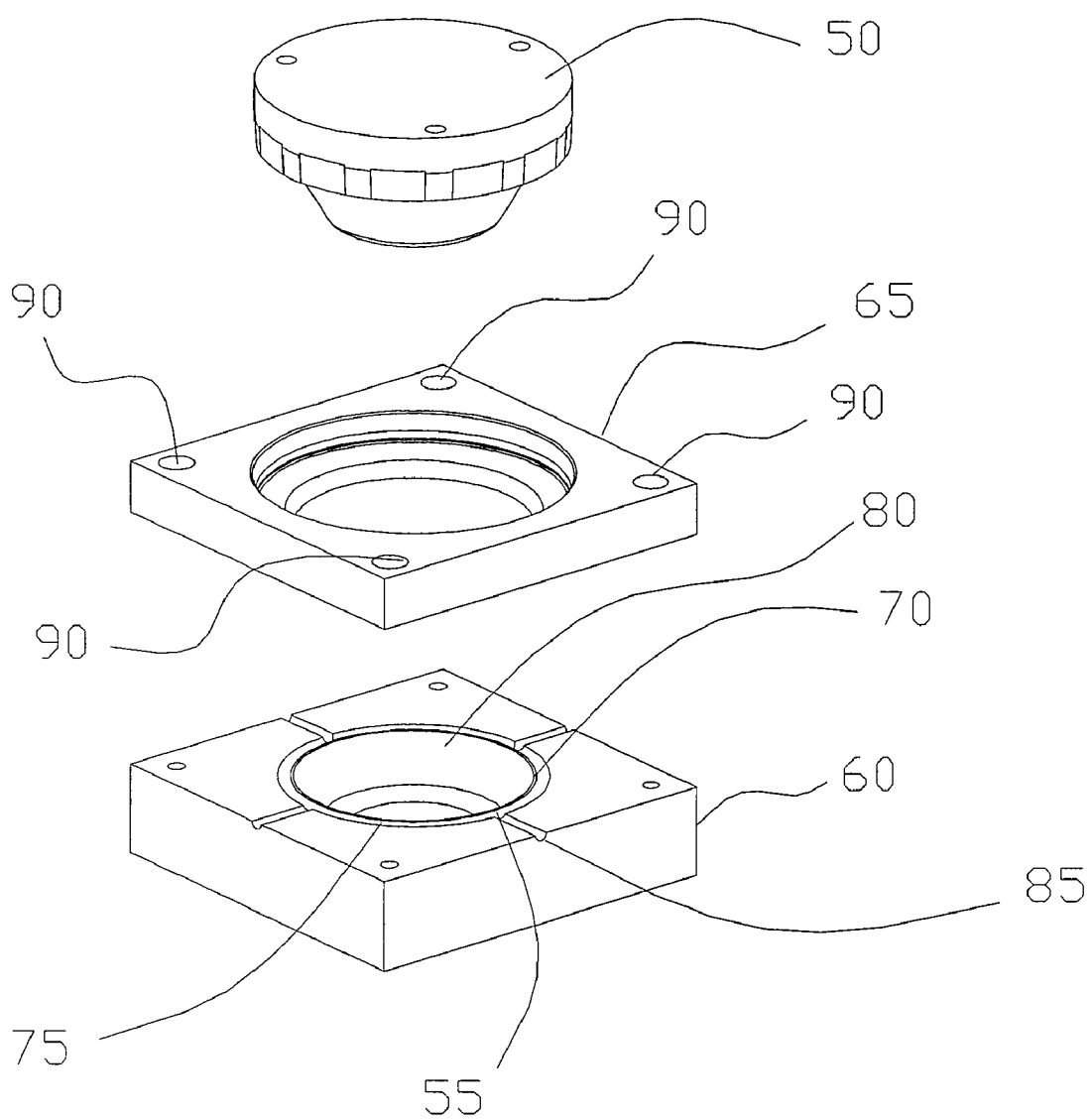
FIG. 6 is a perspective exploded view of a venting feature applied in a horizontal fashion to a female mold.

Referring to FIGS. 4 to 6, a mold 40 according to the present invention is shown having a female mold half 45 and a male mold half 50 with horizontal venting of the female mold half 45. Referring to FIG. 4, the female mold half 45 is shown having a gap 55 for venting gas formed during heating or baking. Referring to FIG. 6, the female mold half 45 is further comprised of a lower half 60 and an upper half 65 held together by fasteners 90 such as bolts or screws.

Referring to FIG. 5, a cross-section along the plane A-A of FIG. 4 is shown where the gap 55 is visible on opposite sides of the female mold half 45, the gap 55 having a channels 85, a first portion 70 and a second portion 75, where the second portion 75 is wider than the first portion 70. Section B of FIG. 5 enlarges a portion of mold 40 showing a cavity 80 and the first portion 70, the second portion 75 and the channels 85 of gap 55.

Referring to FIG. 6, an exploded view of the mold 40 is shown having the gap 55 in the female mold half 45 wherein the female mold half 45 having an upper half 65 and lower half 60 wherein the lower half 60 of the female mold half 45 has channels 85 which when the lower half 60 and the upper half 65 of the female mold half 45 are assembled and held together by fasteners 90, form the gap 55 as shown in FIGS. 4 and 5. Further, when assembled, the first portion 70 and the second portion 75 of the gap 55 are in communication with the entire circumference of the mold cavity 80 where the upper half 65 and the lower half 60 of the female mold half 45 meet, and further being in communication with the channels 85 which are in turn in communication with the exterior of the mold 40.

Figure 7:
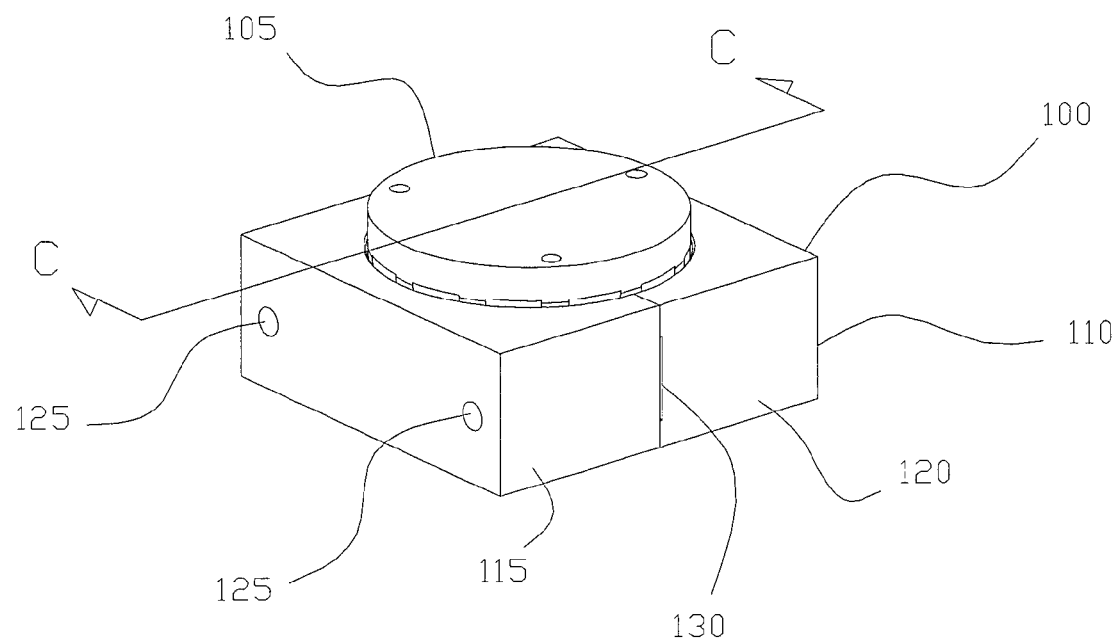
FIG. 7 is a perspective view of a venting feature applied in a vertical fashion to a female mold.
Figure 8:
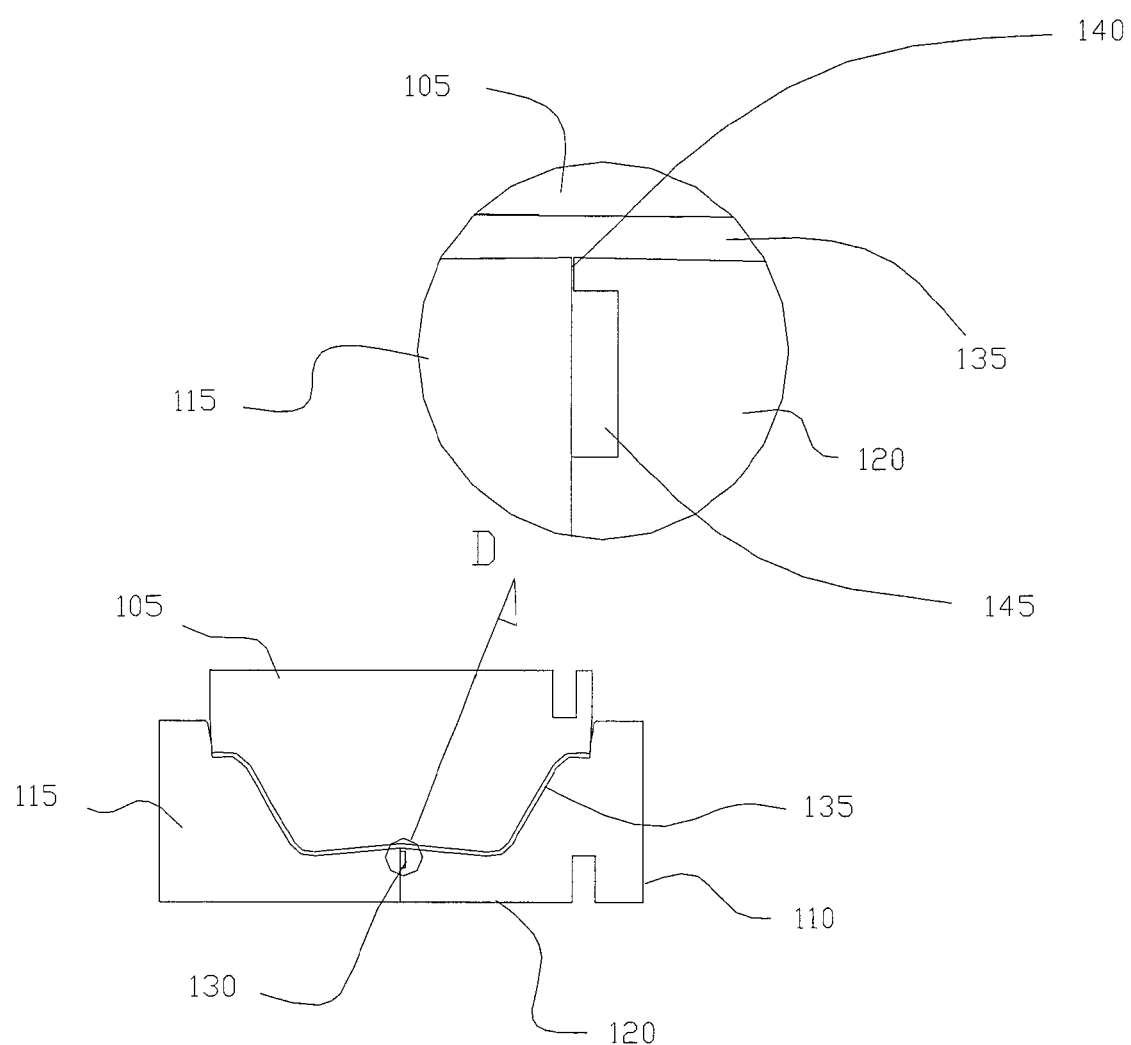
FIG. 8 is a cross-section view of a venting feature applied in a vertical fashion to a female mold.
Figure 9:
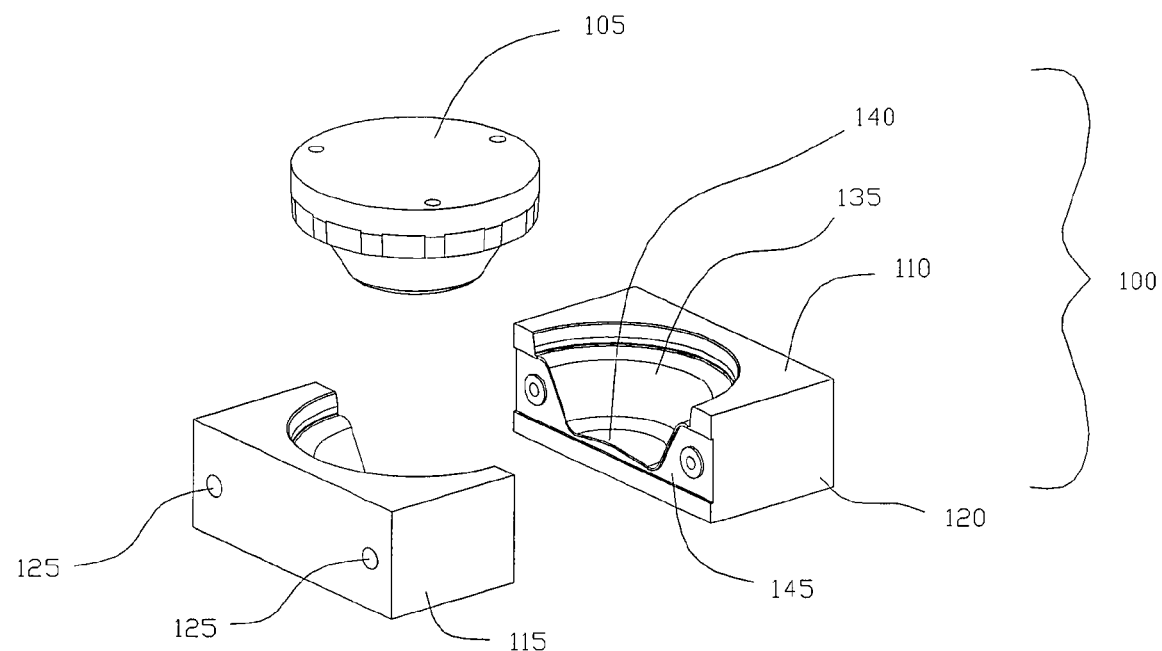
FIG. 9 is a perspective exploded view of a venting feature applied in a vertical fashion to a female mold.

Referring to FIGS. 7 to 9, a mold 100 according to the present invention is shown having a male mold half 105 and a female mold half 110 having vertical venting in the female mold half 110. The female mold half 110 further comprising a first half 115 and a second half 120 held together by fasteners 125 and having a gap 130 for venting steam or vapor during heating or baking, the gap 130 being formed by grooves in at least one of the first half 115 or the second half 120 of the female mold half 110.

Referring to FIG. 8, a cross section along the plane C-C of FIG. 7 is shown wherein the gap 130 is visible in the female mold half 110. Section D of FIG. 8 enlarges a portion of the mold 100 showing the cavity 135 and the first portion 140 and the second portion 145 of gap 130, wherein the second portion 145 is wider than the first portion 140 and wherein the cavity 135 is in communication with the first portion 140 of the gap 130 which in turn is communication with the second portion 145 of the gap 130 which in turn is communication with the exterior of the female mold half 110.

Referring to FIG. 9 an exploded view of the mold 100 is shown wherein the first half 115 and the second half 120 of the female mold half 110, held together by fasteners 125, when assembled form the first portion 140 and second portion 145 of the gap 130 by contact of the first half 115 and the second half 120 of the female mold half 110 and wherein the first portion 140 and the second portion 145 of the gap 130 extend along the entire length of the cavity 135 where the first half 115 and the second half 120 of the female mold half 110 meet.

Figure 10:
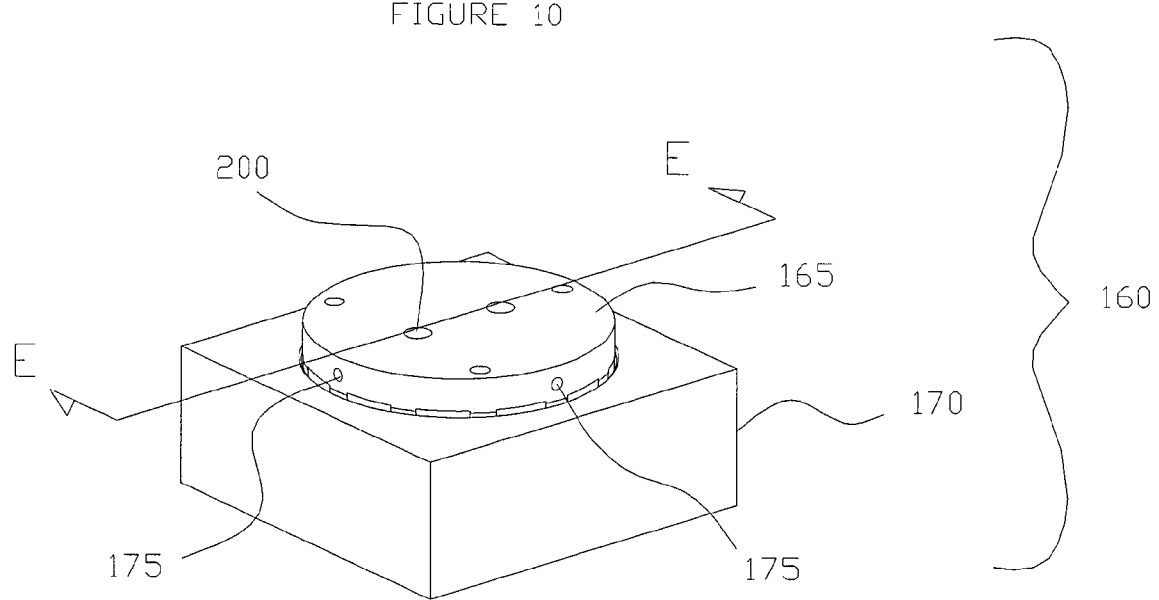
FIG. 10 is a perspective view of a venting feature applied in a horizontal fashion to a male mold.
Figure 11:
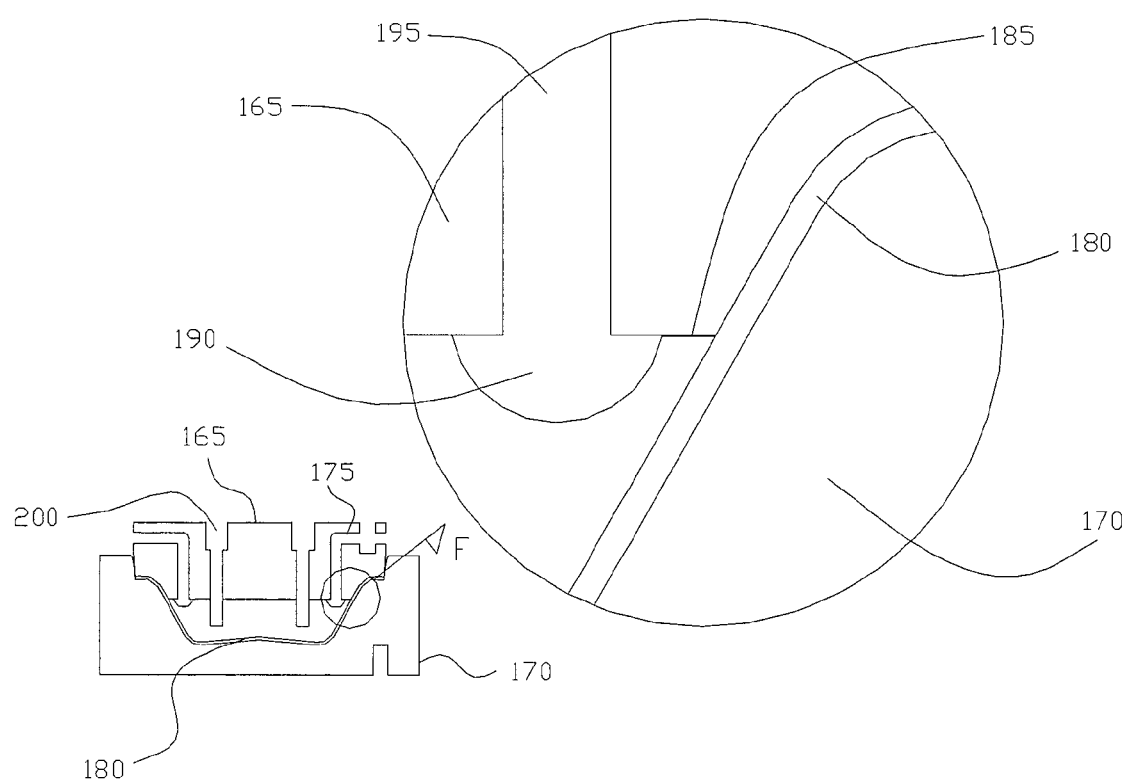
FIG. 11 is a cross-section view of a venting feature applied in a horizontal fashion to a male mold.
Figure 12:
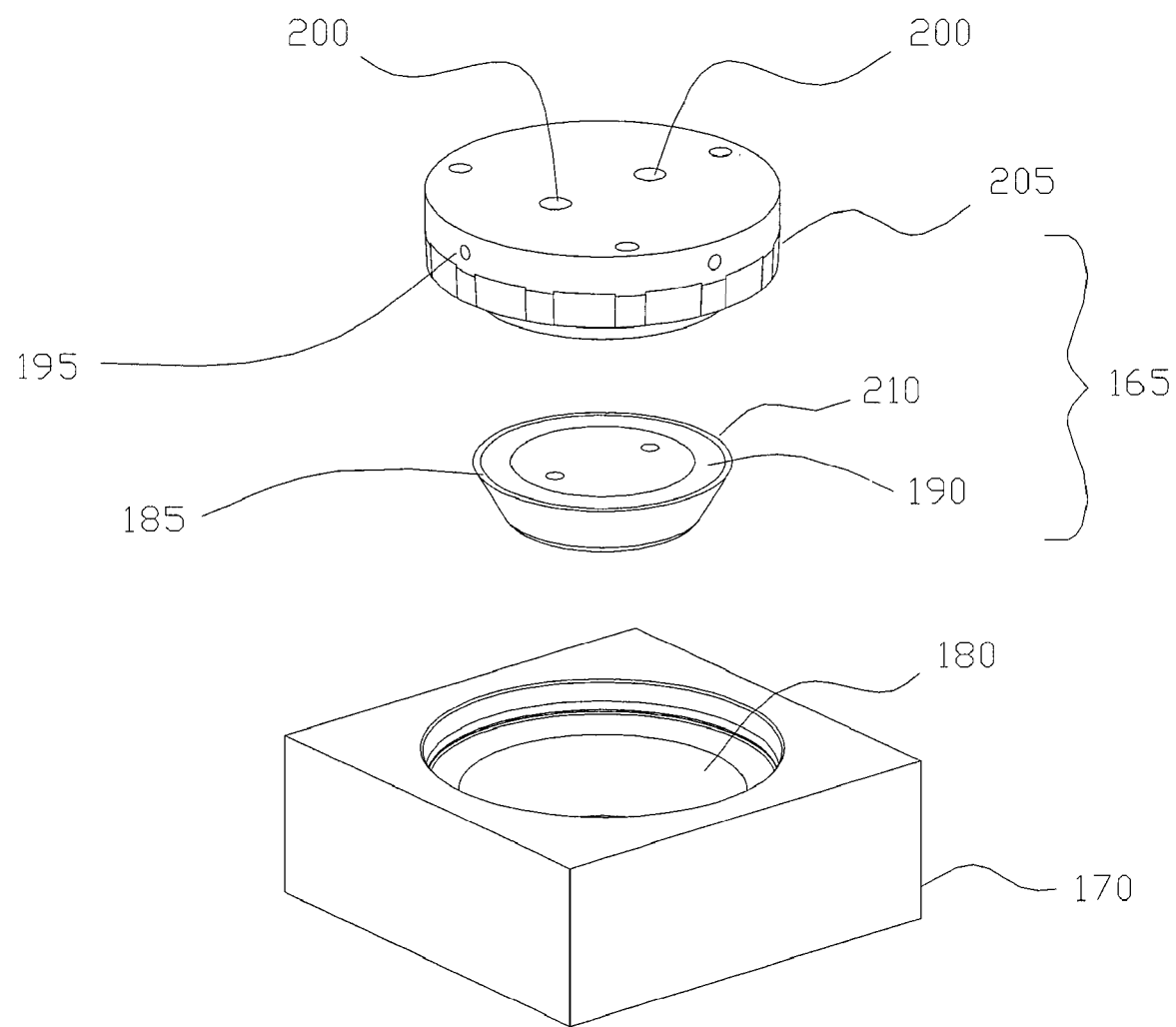
FIG. 12 is a perspective exploded view of a venting feature applied in a horizontal fashion to a male mold.

Referring to FIGS. 10 to 12, a mold 160 according to the present invention is shown having a male mold half 165 and a female mold half 170 and having horizontal venting in the male mold half 165. The male mold half 165 having a gaps 175 for venting steam or vapor during heating or baking.

Referring to FIG. 11, a cross section along the plane E-E of FIG. 10 is shown wherein the venting gap 175 is visible in the male mold half 165. Section F of FIG. 11 enlarges a portion of mold 160 showing a molding cavity 180 and a first portion 185, a second portion 190 and a channel 95 of gap 175, wherein the second portion 190 is wider than the first portion 185. Further, the mold cavity 180 is in communication with the first portion 185 of the gap 175 which in turn is communication with the second portion 190 of the gap 175 which in turn is communication the channel 195 of the gap 175 which in turn is in communication with the exterior of the male mold half 165.

Referring to FIG. 12 an exploded view of the mold 160 is shown wherein the male mold half 165 is further comprised of a first half 205 and a second half 210 held together by fasteners 200 wherein, when assembled, the first portion 185 and second portion 190 of the gap 175 is formed by contact of the first half 205 and the second half 210 of the male mold half 165 and wherein the first portion 185 and the second portion 190 of the gap 175 extend along the entire circumference of the cavity 180 where the first half 205 and the second half 210 of the male mold half 165 meet.

Figure 13:
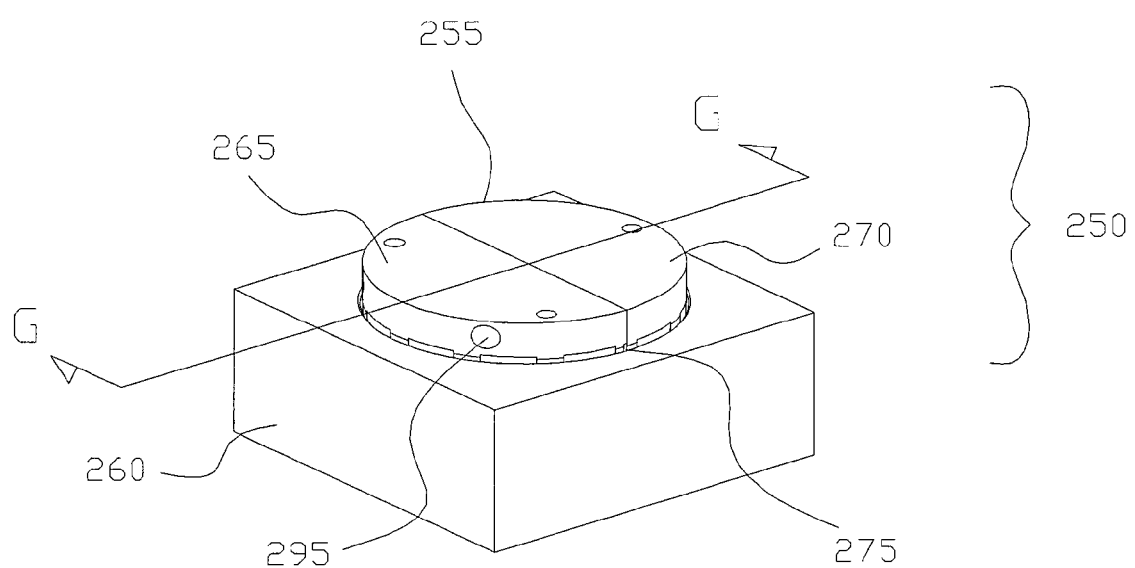
FIG. 13 is a perspective view of a venting feature applied in a vertical fashion to a male mold.
Figure 14:
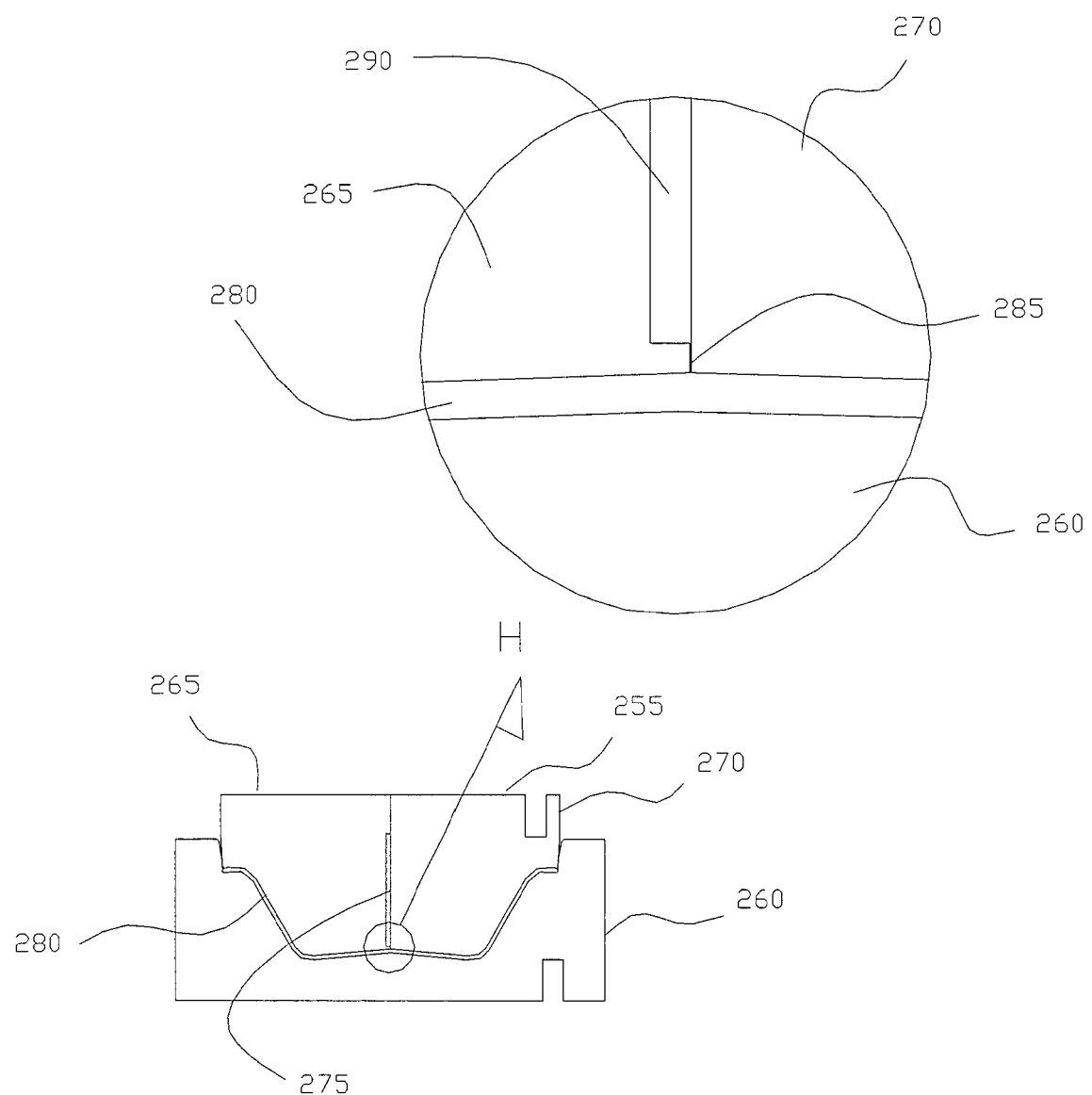
FIG. 14 is a cross-section view of a venting feature applied in a vertical fashion to a male mold.
Figure 15:
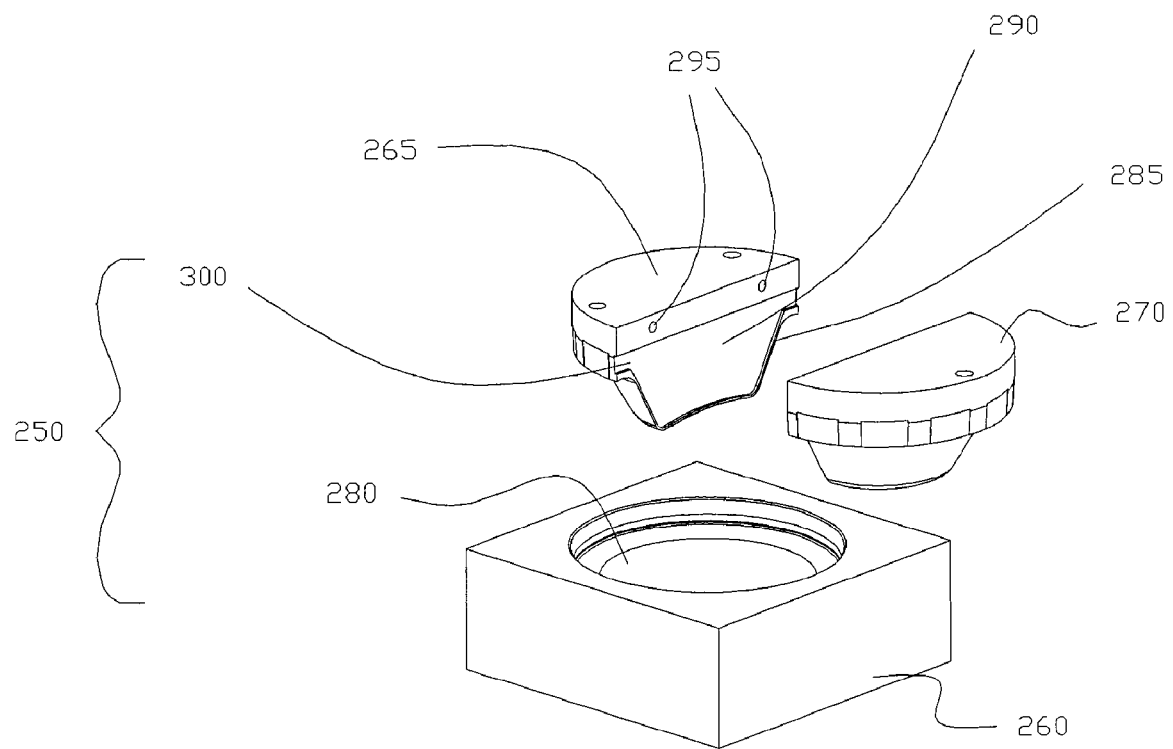
FIG. 15 is a perspective exploded view of a venting feature applied in a vertical fashion to a male mold.

Referring to FIGS. 13 to 15, a mold 250 according to the present invention is shown having a male mold half 255 and a female mold half 260 having vertical venting in the male mold half 255. The male mold half 255 further comprising a first half 265 and a second half 270 held together by fasteners 295, and gaps 275 for venting steam or vapor during heating or baking.

Referring to FIG. 14, a cross-section along the plane G-G of FIG. 12 is shown wherein the gap 275 is visible in the male mold half 255. Section H of FIG. 13 enlarges a portion of the mold 250 showing the cavity 280 and the first portion 285 and the second portion 290 of gap 275, wherein the second portion 290 is substantially wider than the first portion 285 and wherein the second portion 290 extends to the exterior of the male mold half 255 to vent steam or other vapor produced during heating or baking.

Referring to FIG. 15, an exploded view of the mold 250 is shown wherein, when assembled, the cavity 280 is in communication with the first portion 285 of the gap 275 which in turn is communication with the second portion 290 of the gap 275 which in turn is communication with the exterior of the male mold half 255 at 300. The first half 265 and the second half 270 of the male mold half 255, held together by fasteners 295, when assembled form the first portion 285 and second portion 290 of the gap 275 by contact of the first half 265 and the second half 270 of the male mold half 255 and wherein the first portion 285 and the second portion 290 of the gap 275 extend along the entire length of the cavity 280 where the first half 265 and the second half 270 of the male mold half 255 meet.

Although the invention has been described with respect to specific embodiments and examples, it will be readily appreciated by those skilled in the art that modifications and adaptations of the invention are possible without deviation from the spirit and scope of the invention. Accordingly, the scope of the present invention is limited only by the following claims.

What is claimed is:
1. A mold apparatus comprising:
a cavity having a cavity inner surface; and
a gap in communication with the cavity and an exterior of the mold apparatus for venting vapor or steam;
wherein the gap comprises a first portion in direct fluid communication with the cavity and which extends in a substantially continuous manner along the cavity inner surface, wherein the first portion has a width and a length wherein the length is substantially greater than the width, wherein the length of the first portion extends in a substantially continuous manner along at least 50 percent of a perimeter of the cavity inner surface; and wherein the gap further comprises a second portion in direct fluid communication with the first portion and the exterior of the mold apparatus, wherein the second portion is wider than the first portion.

2. The mold apparatus of claim 1 wherein the gap is configured such that in combination with a mixture comprising a skin, vapor or steam is vented from the cavity without escape of a significant amount of the mixture from the cavity and without substantial clogging of the gap with material from the vapor or steam.

3. The mold apparatus of claim 2 wherein the skin is created under baking conditions after the mixture is added to the cavity.

4. The mold apparatus of claim 1 wherein when the mixture is added to the mold apparatus, formation of vapor and steam causes the mixture to substantially fill the cavity.

5. The mold apparatus of claim 1 wherein the first portion of the gap has a width that is in a range from about 0.001 inches to about 0.030 inches.

6. The mold apparatus of claim 1 wherein the first portion of the gap has a width that is in a range from about 0.001 inches to about 0.015 inches.

7. The mold apparatus of claim 1 wherein the first portion of the gap has a depth that is in a range from about 0.001 inches to about 2 inches.

8. The mold apparatus of claim 1 wherein the first portion extends in a substantially continuous manner along a perimeter of the cavity inner surface.

9. The mold apparatus of claim 1 wherein the gap spans a distance extending from the cavity to the exterior of the mold apparatus.

10. A mold apparatus comprising:
a male mold half;
a female mold half wherein contact of the male mold half and the female mold half forms a cavity with an inner cavity surface in a desired shape; and
a gap in communication with the cavity and an exterior of the mold apparatus for venting vapor or steam;
wherein the gap comprises a first portion in direct fluid communication with the cavity and which extends in a substantially continuous manner along the cavity inner surface, wherein the first portion has a width and a length, wherein the length is substantially greater than the width, wherein the length of the first portion extends in a substantially continuous manner along at least 50 percent of a perimeter of the cavity inner surface; and
wherein the gap further comprises a second portion in direct fluid communication with the first portion and the exterior of the mold apparatus, wherein the second portion is wider than the first portion.

11. The mold apparatus of claim 10 wherein the gap is configured such that in combination with a mixture comprising a skin, vapor or steam is vented from the cavity without escape of a significant amount of the mixture from the cavity and without substantial clogging of the gap with material from the vapor or steam.

12. The mold apparatus of claim 10 wherein the skin is created under baking conditions after the mixture is added to the cavity.

13. The mold apparatus of claim 10 wherein when the mixture is added to the mold apparatus, formation of vapor and steam causes the mixture to substantially fill the cavity.

14. The mold apparatus of claim 10 wherein the first portion of the gap has a width in a range from about 0.001 inches to about 0.030 inches.

15. The mold apparatus of claim 10 wherein the first portion of the gap has a width in a range from about 0.001 inches to about 0.015 inches.

16. The mold apparatus of claim 10 wherein the first portion of the gap has a depth in a range from about 0.001 inches to about 2 inches.

17. The mold apparatus of claim 10 wherein the first portion extends in a substantially continuous manner along a perimeter of the cavity inner surface.

* * * * *